United States Patent
Lee et al.

(10) Patent No.: US 9,747,777 B2
(45) Date of Patent: Aug. 29, 2017

(54) RFID-INTEGRATED SELF-POWERED TTI

(71) Applicant: DONGGUK UNIVERSITY INDUSTRY-ACADEMIC COOPERATION FOUNDATION, Seoul (KR)

(72) Inventors: Seung Ju Lee, Seoul (KR); Seung Won Jung, Gyeonggi-do, KS (US)

(73) Assignee: DONGGUK UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 15/180,362

(22) Filed: Jun. 13, 2016

(65) Prior Publication Data
US 2017/0206770 A1    Jul. 20, 2017

(30) Foreign Application Priority Data
Jan. 15, 2016   (KR) .......................... 10-2016-0005256

(51) Int. Cl.
| | |
|---|---|
| G08B 17/00 | (2006.01) |
| G08B 21/18 | (2006.01) |
| H04W 4/00 | (2009.01) |
| G06K 7/10 | (2006.01) |

(52) U.S. Cl.
CPC ....... *G08B 21/182* (2013.01); *G06K 7/10366* (2013.01); *H04W 4/008* (2013.01)

(58) Field of Classification Search
CPC ...... G01N 31/229; G01N 21/78; B65D 79/02; G01K 3/005; G01K 3/04; G01K 1/02; G01K 1/24

USPC ...... 340/309.16, 572.8, 539.27, 588, 539.26; 116/201, 206, 207, 216; 374/102, 374/E3.004, E7.001
See application file for complete search history.

(56) References Cited

U.S. PATENT DOCUMENTS

| | | | |
|---|---|---|---|
| 7,209,042 B2* | 4/2007 | Martin .................. | B65D 79/02 250/482.1 |
| 7,604,398 B1* | 10/2009 | Akers ..................... | G01K 1/02 116/216 |

(Continued)

OTHER PUBLICATIONS

Ammam, M. et al, "Micro-biofuel cell powered by glucose/O2 based on electro-deposition of enzyme, conducting polymer and redox mediators: Preparation, characterization and performance in human serum," Biosensors and Bioelectronics 25 (2010) 1474-1480.

(Continued)

*Primary Examiner* — Hoi Lau
(74) *Attorney, Agent, or Firm* — Barnes & Thornburg LLP

(57) ABSTRACT

The present invention provides a radio frequency identification (RFID)-integrated self-powered time-temperature integrator (TTI), which comprises an RFID and a self-powered TTI which is attached to the exterior of a package of food to output an electric signal indicating a storage state of the food and supplies the electric signal as an operating power of the RFID, in which the electric signal output from the self-powered TTI is a voltage corresponding to a rate of a change in quality of the food accompanied, the quality is calculated by an integration value of time-voltage, and an integration algorithm uses an integrated value, obtained by adding the voltage measured every hour, as a quality variable of the food.

6 Claims, 2 Drawing Sheets

(56) References Cited

U.S. PATENT DOCUMENTS

| | | | | |
|---|---|---|---|---|
| 2004/0212508 A1* | 10/2004 | Zweig | ............... | G01K 3/04 340/588 |
| 2005/0239917 A1* | 10/2005 | Nelson | ............... | B41M 3/006 523/160 |
| 2005/0248455 A1* | 11/2005 | Pope | ............... | G01K 1/024 340/539.27 |
| 2006/0061454 A1* | 3/2006 | Debord | ............... | G01K 3/005 340/309.16 |
| 2006/0145863 A1* | 7/2006 | Martin | ............... | B65D 79/02 340/572.8 |
| 2007/0243621 A1* | 10/2007 | Zweig | ............... | G01N 33/54373 436/83 |
| 2008/0110391 A1* | 5/2008 | Taylor | ............... | G01K 3/005 116/216 |
| 2008/0187021 A1* | 8/2008 | Haarer | ............... | G01K 3/04 374/102 |
| 2010/0251955 A1* | 10/2010 | Knoll | ............... | G02F 1/1525 116/206 |
| 2010/0296545 A1* | 11/2010 | Haarer | ............... | G01N 31/229 374/102 |
| 2011/0155043 A1* | 6/2011 | Haarer | ............... | G01K 3/04 116/201 |
| 2011/0301903 A1* | 12/2011 | Humbert | ............... | G01D 18/008 702/104 |
| 2012/0079981 A1* | 4/2012 | Huffman | ............... | G01K 3/04 116/207 |
| 2012/0175412 A1* | 7/2012 | Grabiner | ............... | G06F 19/327 235/375 |
| 2013/0081566 A1* | 4/2013 | Boyaci | ............... | G01K 3/04 116/207 |
| 2013/0209615 A1* | 8/2013 | Lee | ............... | G01N 33/02 426/88 |
| 2014/0119402 A1* | 5/2014 | Deng | ............... | B65D 79/02 374/102 |
| 2015/0308901 A1* | 10/2015 | Salman | ............... | G01K 3/04 374/102 |

OTHER PUBLICATIONS

Kim, M.J. et al., "A novel self-powered time-temperature integrator (TTI) using modified biofuel cell for food quality monitoring," Food Control 70 (2016), 167-173.

Shim, S.D. et al., "Mathematical Evaluation of Prediction Accuracy for Food Quality by Time Temperature Integrator of Intelligent Food Packaging through Virtual Experiments," Mathematical Problems in Engineering, vol. 2013, Article ID 950317, 9 pages.

Wan, Xianglong et al., "A new type of TTI based on an electrochemical pseudo transistor," Journal of Food Engineering 168 (2016), 79-83.

Office Action for Korean Patent Application No. 10-2016-0005256; Jan. 25, 2017.

* cited by examiner

FIG. 3A & FIG. 3B
FIG. 3A
FIG. 3B
FIG. 4
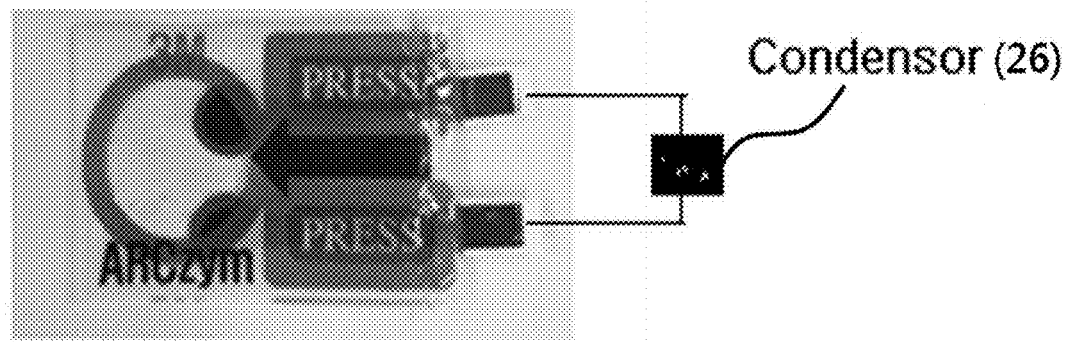

RFID-INTEGRATED SELF-POWERED TTI

CROSS-REFERENCE TO RELATED PATENT APPLICATION

This application claims the benefit of Korean Patent Application No. 10-2016-0005256, filed on Jan. 15, 2016, in the Korean Intellectual Property Office, the disclosure of which is incorporated herein in its entirety by reference.

BACKGROUND OF THE INVENTION

1. Field of the Invention

The present invention relates to a radio frequency identification (RFID)-integrated self-powered time-temperature integrator (TTI) and, more particularly, to an RFID-integrated self-powered TTI, which is electrically connected to an RFID, is attached to the exterior of a package of food to output an electric signal indicating a storage state (i.e., temperature history over time) of the food in the package, and supplies the electric signal as an operating power of the RFID.

2. Description of the Related Art

Recently, due to diversification, advancement, and simplification of food, the interest in safe and convenient food supply systems has increased. People tend to prefer high quality food with the perception of the quality and safety of food beyond the existing quantitative food consumption pattern.

Moreover, as the desire for the quality of the food increases, the need to predict change in food quality in a scientific manner is required, and in order to improve its competitiveness, it is necessary to minimize the change in food quality during distribution.

To this end, as part of research aimed at predicting the change in food quality with economic costs, the use of time-temperature integrators (TTIs) in the distribution of a variety of foods such as seafood, fruits, vegetables, meats, dairy products, etc. has recently been reported.

The time-temperature integrator (TTI) refers to a kind of sensor that quantitatively indicates the history of accurate time and temperature that the food experiences during storage and transport, and the TTIs are generally used to predict the quality of the food accompanied from a color change due to the time and temperature history.

These TTIs have advantages that the time and temperature history of perishable foods can be easily monitored, and the monitoring can be performed at low costs; however, the function to indicate a reaction with a color change is limited, which is not suitable as an element of an IT-based distribution system.

SUMMARY OF THE INVENTION

The present invention has been made in an effort to solve the above-described problems associated with prior art, and an object of the present invention is to provide an RFID-integrated self-powered TTI, which is electrically connected to an RFID, is attached to the exterior of a package of food to output an electric signal indicating a storage state (i.e., temperature history over time) of the food in the package, supplies the electric signal as an operating power of the RFID, and thus can be used as a sensor for detecting the storage state of the food in an IT-based distribution system.

To accomplish the above objects of the present invention, there is provided a radio frequency identification (RFID)-integrated self-powered time-temperature integrator (TTI), comprising: an RFID; and a self-powered TTI which is attached to the exterior of a package of food to output an electric signal indicating a storage state of the food and supplies the electric signal as an operating power of the RFID.

The electric signal output from the self-powered TTI of the present invention may be a voltage corresponding to a rate of a change in quality of the food accompanied, the quality may be calculated by an integration value of time-voltage, and an integration algorithm may use an integrated value, obtained by adding the voltage measured every hour, as a quality variable of the food.

The RFID electrically connected to the self-powered TTI of the present invention may be connected to a calculation unit and a display unit through a wired or wireless network.

Each of the calculation unit and the display unit of the present invention may comprise a wired/wireless communication module which is connected to the RFID through a wired or wireless network to transmit and receive necessary information between each other.

The self-powered TTI of the present invention may comprise a TTI label serving as a frame and comprising two spaces; one being filled with an enzyme, into which a negative electrode and a positive electrode are inserted, and the other being filled with a substrate a space, and a barrier may be provided between the two spaces.

The present invention may further comprise a condenser which is connected in parallel between the negative electrode and the positive electrode to minimize the load of the continuous voltage measurement by the RFID and the burden of the calculation borne by the calculation unit.

BRIEF DESCRIPTION OF THE DRAWINGS

The above and other features and advantages of the present invention will become more apparent by describing in detail exemplary embodiments thereof with reference to the attached drawings in which:

FIGS. 3A-3B show an exemplary diagram showing the front (FIG. 3A) and rear (FIG. 3B) of the self-powered TTI according to the present invention; and FIG. 4 is an exemplary diagram showing that a condenser is connected to the self-powered TTI according to the present invention.

DETAILED DESCRIPTION OF THE INVENTION

Figure 1:
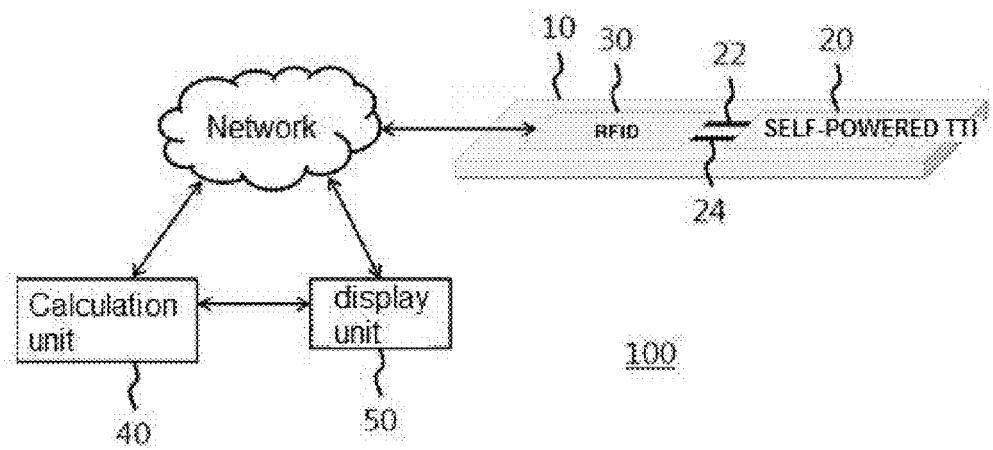
FIG. 1 is a schematic diagram showing the configuration of an IT-based distribution system to which an RFID-integrated self-powered TTI according to the present invention is applied.

Hereinafter, exemplary embodiments of the present invention will be described with reference to the accompanying drawing. First of all, it is to be noted that in giving reference numerals to elements of each drawing, like reference numerals refer to like elements even though like elements are shown in different drawings. Moreover, when it is determined that the detailed description of the known art related to the present invention may obscure the gist of the present invention, the detailed description thereof will be omitted. Furthermore, exemplary embodiments of the present invention will be described below, but the technical idea of the present invention is not limited or restricted and may be carried out by a person having ordinary skill in the art.

Figure 2:
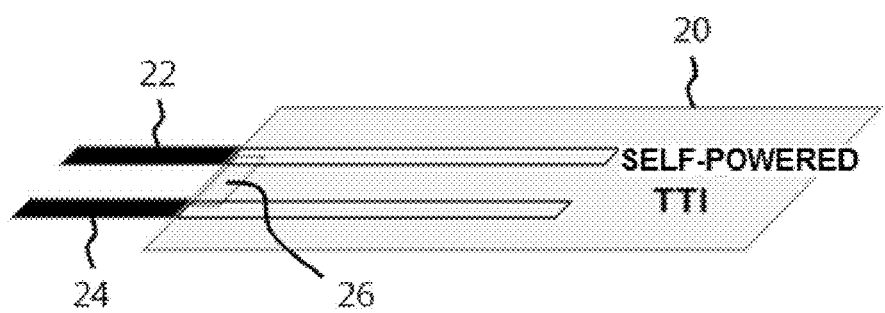
FIG. 2 is a diagram showing the configuration of the RFID-integrated self-powered TTI shown in FIG. 1.

FIG. 1 is a schematic diagram showing the configuration of an RFID-integrated self-powered TTI in accordance with a preferred embodiment of the present invention, FIG. 2 is a diagram showing the configuration of the RFID-integrated self-powered TTI shown in FIG. 1, FIGS. 3A-3B show an exemplary diagram showing the front (FIG. 3A) and rear (FIG. 3B) of the self-powered TTI according to the present invention, and FIG. 4 is an exemplary diagram showing that a condenser is connected to the self-powered TTI according to the present invention.

First, the time-temperature integrator (TTI) refers to a kind of sensor that quantitatively indicates the history of accurate time and temperature that the food experiences during storage and transport, and the TTIs are generally used to indirectly predict the quality of the food accompanied from a color change due to the time and temperature history. Here, the color change of the TTI is based on chemical, physical, and biological reactions of sensor components.

The RFID-integrated self-powered TTI 10 according to the present invention employs an enzymatic TTI. For reference, the enzymatic TTI is based on a color change caused by a pH decrease due to the hydrolysis of a lipid as a substrate. The enzymatic TTI may be divided into two compartments: one compartment contains a lipase emulsifier, and the other compartment contains a pH indicator and a lipid emulsifier.

Various enzyme substrates may be used depending on the purpose of use, and the reaction of the TTI is activated by artificial destruction of a barrier that separates the two compartments. The hydrolysis of the substrate causes a pH decrease or changes the color of an indicator, or the reaction of the substrate directly changes the color of the indicator.

The RFID-integrated self-powered TTI 10 in accordance with a preferred embodiment the present invention is a wireless sensor applied to an IT-based distribution system 100 which provides food shelf-life information, for example, and comprises a self-powered TTI 20 and an RFID 30.

The RFID 30 electrically connected to the self-powered TTI 20 is connected to a calculation unit 40 and a display unit 50 through a wired or wireless network. Each of the calculation unit 40 and the display unit 50 comprises a wired/wireless communication module which is connected to the RFID 30 through a wired or wireless network to transmit and receive necessary information between each other.

The self-powered TTI 20 comprises a TTI label, which serves as a frame and comprises a space where a negative electrode 22 and a positive electrode 24 are inserted, and a condenser 26 which is connected in parallel between the negative electrode 22 and the positive electrode 24.

The TTI label comprises two spaces; one being filled with an enzyme, and the other being filled with a substrate. Upon use, a barrier between the two spaces is destructed by pressing it by hand such that the two materials are mixed to initiate the reaction. To this end, the two electrodes 22 and 24 are inserted into the space assigned to the enzyme, the substrate is put into the other space, and the two spaces are closed by a TTI label film. The space into which the two electrodes 22 and 24 are inserted is filled with a buffer solution.

Each of the electrodes 22 and 24 of the self-powered TTI 20 is manufactured by forming a metal line corresponding to an electric wire with a silver paste by screen printing on a polycarbonate (PC) substrate and then printing a carbon paste thereon.

Here, the edges of the silver line and the carbon electrode are brought into contact with each other to maintain the electrical conductivity. After printing the electrodes, the electrodes are passivated with epoxy such that the silver line is not in contact with the solution.

The resulting self-powered TTI 20 outputs a voltage through the two electrodes 22 and 24, this output voltage corresponds to the rate of the change in quality of the corresponding food, and the quality is defined by an integration value of time-voltage.

The integration algorithm performed by the calculation unit 40 uses an integrated value, obtained by adding the voltage measured every hour, as a quality variable of the food. While this method is simple, it is required to continuously measure the voltage of the self-powered TTI 20, which is a load to the RFID 30.

In order to minimize the load of the continuous voltage measurement by the RFID 30 and the burden of the calculation borne by the calculation unit 40, the integration is performed on the voltage output from the self-powered TTI 20 in a hardware manner. That is, the condenser 26 is provided in parallel between the two electrodes 22 and 24 to add up the voltage generated by the self-powered TTI 20. Therefore, the charge of the condenser 26 corresponds to a quality variable of the food and is calculated as a voltage.

Here, the voltage as a reaction variable of the self-powered TTI 20 is a result with the current generated from the reaction, and the rate of coulomb per second is the amount of electrons generated per hour and thus corresponds to the reaction rate:

$$V = \frac{dx}{dt} \qquad \text{[Equation 1]}$$

wherein V is the output voltage of the self-powered TTI 20 and X is the concentration of the enzyme reactant.

The variable indicating the change in food quality is the concentration of the enzyme reactant, and thus Equation 1 can be integrated as follows:

$$X = \int_0^t V dt. \qquad \text{[Equation 2]}$$

First, a correlation equation (f) is obtained by performing an isothermal storage test of the self-powered TTI 20 and food and used to predict the food quality:

$$Y = f(X) \qquad \text{[Equation 3]}$$

That is, the prediction of the food quality is performed to calculate a food quality variable Y by substituting X of the self-powered TTI 20 into f during the storage test.

Hereinafter, the present invention will be described in detail by way of Examples and Experimental Examples. However, the following Examples and Experimental Examples are only for illustrating the present invention, and the scope of the present invention is not limited to the following Examples and Experimental Examples.

Experimental Example 1: Control of Temperature Dependence of TTI

The prediction of food quality by the self-powered TTI 20 is based on the similarity between the food accompanied and the temperature dependence. Therefore, the temperature dependence of the output voltage of the self-powered TTI 20 was controlled by adding 0 to 60 mM sodium azide.

The voltage measurement was performed by connecting a potentiometer (recorder type, EYELA, Japan) to the two electrodes 22 and 24 of the self-powered TTI 20 to record a change in voltage over time.

The voltage range of the potentiometer was set to 0 to 100 mV, and when the voltage was decreased over time, the voltage range was set to 0 to 50 mV and then 0 to 10 mV step by step to increase the accuracy of the measurement.

To measure the temperature dependence, the self-powered TTI 20 was immersed in a water bath and kept under isothermal conditions of 5, 15, and 25° C. to measure the voltage over time. The temperature dependence was compared by varying the amount of sodium azide added.

$$V = V_0 \exp\left(\frac{-Ea}{RT}\right) \quad \text{[Equation 4]}$$

wherein V is the voltage, $V_o$ is the Arrhenius constant, Ea is the Arrhenius activation energy, R is the ideal gas constant, and T is the temperature.

Experimental Example 2

The self-powered TTI 20 and milk were placed in a constant-temperature oven for dynamically controlling the time and temperature, and the voltage of the self-powered TTI 20 and the milk quality over time were measured.

The milk quality index was measured based on the number of aerobic mesophilic bacteria (AMB) having the most similar Ea to the Ea value of the self-powered TTI 20 used in Experimental Example 2. See the following Tables 1 and 2.

TABLE 1

| Sodium azide concentration (M) | Temperature (° C.) | k (mV) | Ea (kJ/mol) | $R^2$ |
|---|---|---|---|---|
| 0 | 5 | 0.0008 | 52.756 | 0.9998 |
|  | 15 | 0.0018 |  |  |
|  | 25 | 0.0037 |  |  |
| 0.002 | 5 | 0.0008 | 53.664 | 1.0000 |
|  | 15 | 0.0019 |  |  |
|  | 25 | 0.0038 |  |  |
| 0.004 | 5 | 0.0025 | 56.726 | 0.9980 |
|  | 15 | 0.0055 |  |  |
|  | 25 | 0.013 |  |  |

TABLE 1-continued

| Sodium azide concentration (M) | Temperature (° C.) | k (mV) | Ea (kJ/mol) | $R^2$ |
|---|---|---|---|---|
| 0.006 | 5 | 0.0035 | 57.406 | 0.9967 |
|  | 15 | 0.009 |  |  |
|  | 25 | 0.0185 |  |  |
| 0.008 | 5 | 0.0042 | 57.689 | 0.9960 |
|  | 15 | 0.0094 |  |  |
|  | 25 | 0.024 |  |  |
| 0.01 | 5 | 0.0058 | 61.697 | 0.9985 |
|  | 15 | 0.0155 |  |  |
|  | 25 | 0.0345 |  |  |
| 0.02 | 5 | 0.00615 | 78.222 | 0.9174 |
|  | 15 | 0.0357 |  |  |
|  | 25 | 0.0588 |  |  |
| 0.04 | 5 | 0.006 | 65.850 | 0.9956 |
|  | 15 | 0.018 |  |  |
|  | 25 | 0.0405 |  |  |
| 0.06 | 5 | 0.007 | 52.421 | 0.9942 |
|  | 15 | 0.017 |  |  |
|  | 25 | 0.032 |  |  |

TABLE 2

|  |  | Temperature (° C.) | Zero-order Reaction | | First-order Reaction | | Reaction order | Ea(kJ/mol) | $R^2$ |
|---|---|---|---|---|---|---|---|---|---|
|  |  |  | k(l/h) | $R^{2*}$ | k(l/h) | $R^2$ |  |  |  |
| The milk Qualities | Aerobic mesophilic Bacteria[a] | 8 | 192.4 | 0.69 | 0.0220 | 0.95 | First-order | 101 | 0.98 |
|  |  | 15 | 1652.7 | 0.78 | 0.0510 | 0.96 |  |  |  |
|  |  | 24 | 7125.1 | 0.77 | 0.2210 | 0.99 |  |  |  |
|  | Lactic acid Bacteria[a] | 8 | 21.5 | 0.67 | 0.0060 | 0.93 | First-order | 107 | 0.99 |
|  |  | 15 | 166.5 | 0.6 | 0.0188 | 0.92 |  |  |  |
|  |  | 24 | 1404.6 | 0.78 | 0.0705 | 0.98 |  |  |  |
|  | % Lactic acid[b] | 8 | 0.0001 | 0.94 | 0.0009 | 0.93 | First-order | 122 | 0.95 |
|  |  | 15 | 0.0004 | 0.95 | 0.0028 | 0.99 |  |  |  |
|  |  | 24 | 0.0023 | 0.98 | 0.0150 | 0.99 |  |  |  |
|  | pH | 8 | 0.0004 | 0.99 | 0.0001 | 0.95 | Zero-order | 145 | 0.95 |
|  |  | 15 | 0.0022 | 0.98 | 0.0003 | 0.96 |  |  |  |
|  |  | 24 | 0.0123 | 0.95 | 0.0021 | 0.93 |  |  |  |

[a]A microbial assay (AMB and LAB) was measured according to K.F.D.A. (2000).
[b]% Lactic acid was measured according to K.A.P.O.A. (2012).
*Coefficient of determination The value of the change in milk quality predicted from Equations 2 and 2 and the actual measurement value based on the voltage of the self-powered TTI 20 were compared and analyzed.

Under each time-temperature history, the measurement of the voltage of the self-powered TTI 20 and the milk quality was repeated three times to provide the mean value and standard deviation.

The output voltage of the self-powered TTI 20 depends on the amount of enzymes, substrates, and mediators involved in the oxidation-reduction reaction. Here, the enzyme refers to the corresponding amount of immobilized enzyme.

As described above, the RFID-integrated self-powered TTI of the present invention is electrically connected to an RFID, is attached to the exterior of a package of food to output an electric signal indicating a storage state (i.e., temperature history over time) of the food in the package, supplies the electric signal as an operating power of the RFID, and thus can be used as a sensor for detecting the storage state of the food in an IT-based distribution system.

Therefore, the technical problem solved by the present invention is to provide a self-powered TTI, which can be integrated with an RFID to improve the function of the TTI, and thus can be used as a sensor for detecting the storage state of food in an IT-based distribution system.

The spirit of the present invention has been just exemplified. It will be appreciated by those skilled in the art that various modifications, changes, and substitutions can be made without departing from the essential characteristics of the present invention. Accordingly, the exemplary embodiments disclosed in the present invention and the accompanying drawings are used not to limit but to describe the spirit of the present invention. The scope of the present invention is not limited only to the embodiments and the accompanying drawings. The protection scope of the present invention must be interpreted by the appended claims and it should be interpreted that all spirits within a scope equivalent thereto are included in the appended claims of the present invention.

What is claimed is:

1. A radio frequency identification (RFID)-integrated self-powered time-temperature integrator (TTI) comprising: an RFID; and a self-powered TTI which is attached to the exterior of a package of food to output an electric signal indicating a storage state of the food and supplies the electric signal as an operating power of the RFID.

2. The RFID-integrated self-powered TTI of claim 1, wherein the electric signal output from the self-powered TTI is a voltage corresponding to a rate of a change in quality of the food accompanied, the quality is calculated by an integration value of time-voltage, and an integration algorithm uses an integrated value, obtained by adding the voltage measured every hour, as a quality variable of the food.

3. The RFID-integrated self-powered TTI of claim 1, wherein the RFID electrically connected to the self-powered TTI is connected to a calculation unit and a display unit through a wired or wireless network.

4. The RFID-integrated self-powered TTI of claim 3, wherein each of the calculation unit and the display unit comprises a wired/wireless communication module which is connected to the RFID through a wired or wireless network to transmit and receive necessary information between each other.

5. The RFID-integrated self-powered TTI of claim 1, wherein the self-powered TTI comprises a TTI label serving as a frame and comprising two spaces; one being filled with an enzyme, into which a negative electrode and a positive electrode are inserted, and the other being filled with a substrate a space, and a barrier is provided between the two spaces.

6. The RFID-integrated self-powered TTI of claim 5, further comprising a condenser which is connected in parallel between the negative electrode and the positive electrode to minimize the load of the continuous voltage measurement by the RFID and the burden of the calculation borne by the calculation unit.

* * * * *